United States Patent [19]

Facas et al.

[11] Patent Number: 5,765,586
[45] Date of Patent: Jun. 16, 1998

US005765586A

[54] REDUCTION OF HEAT TRANSFER BETWEEN A BODY AND ITS ENVIRONMENT

[75] Inventors: Georges Facas, Pennsauken; Harry L. Brown, Ocean City, both of N.J.

[73] Assignee: Powermass Corporation, Boston, Mass.

[21] Appl. No.: 345,131

[22] Filed: Nov. 28, 1994

[51] Int. Cl.$^6$ ..................................... F16L 7/00
[52] U.S. Cl. ..................... 137/15; 137/375; 165/47; 165/135; 138/105; 138/148; 220/426; 220/428
[58] Field of Search ..................... 138/148, 105; 165/135, 47; 137/15, 375; 220/426, 428

[56] References Cited

U.S. PATENT DOCUMENTS

| | | | |
|---|---|---|---|
| 2,078,606 | 4/1937 | Le Grund | 137/375 |
| 2,663,323 | 12/1953 | Thomas | 138/105 |
| 2,901,775 | 9/1959 | Goff | 138/105 |
| 2,972,968 | 2/1961 | Stafford | 138/105 |
| 3,018,018 | 1/1962 | Beckwith | 220/426 |
| 3,019,937 | 2/1962 | Morrison | 220/426 |
| 3,020,618 | 2/1962 | Eward | 138/148 |
| 3,150,691 | 9/1964 | Peterson | 138/105 |
| 3,421,328 | 1/1969 | Oosterbaan | 138/105 |
| 3,807,183 | 4/1974 | Wolff | 138/105 |
| 3,933,181 | 1/1976 | Nilsson et al. | 138/105 |
| 4,464,082 | 8/1984 | Isaacs | 138/105 |
| 4,844,657 | 7/1989 | Ripley et al. | 138/105 |
| 5,055,334 | 10/1991 | Lechuga | 137/375 |
| 5,341,830 | 8/1994 | Helmsderfer et al. | 137/15 |

FOREIGN PATENT DOCUMENTS

| | | | |
|---|---|---|---|
| 1905867 | 9/1969 | Germany | 138/105 |
| 3338470 | 5/1985 | Germany | 138/105 |

OTHER PUBLICATIONS

Morgan, V.T.; *Adv. Heat Transfer*, 1975; vol. 11, pp. 199–264; "The Overall Convective Heat Transfer from Smooth Circular Cylinders".

Hermann, R.; *NACA TM*, 1954; p. 1366; "Heat Transfer by Free Convention from Horizontal Cylinders ...".

Levy, S.; *J. Appl. Mech.*; 1995; vol. 22, pp. 515–522; "Integral Methods in Natural Convection Flow".

Chiang, T. and Kaye, J.; *Proceedings of the Fourth National Congress of Applied Mechanics*, 1962, pp. 1213–1219, "On Laminar Free Convection From a Horizontal Cylinder".

McAdams, W.H.; *Heat Transmission*; 1954; 3rd edn., p. 176; McGraw-Hill, NY.

Churchill, S.W. and Chu H.H.S.; *Int. J. Heat Mass Transfer*, 1975; vol. 18, pp. 1049–1053; "Correlating Equations for Laminar and Turbulent Free Convection from a Horizontal Cylinder ...".

Keuhn, T.H. and Goldstein, R.J.; *Int. J. Heat Mass Transfer*, 1980, vol. 23, pp. 971–979 . "Numerical Solutions to the Navier Stokes Equations for Laminar Natural Convection ...".

Farouk, B. and Guceri, S.L., *ASME Journal of Heat Transfer*, 1981; vol. 103, pp. 522–527; "Natural Convection from a Horizontal Cylinder–Laminar Regime".

Saitoh, T. Sajiki, T., and Maruhara, K., *Int J. Heat Mass Transfer*, 1993; vol. 36, No. 5, pp. 1251–1259; "Bench Mark Solutions to Natural Convection Heat Transfer Problems ...".

(List continued on next page.)

*Primary Examiner*—John K. Ford
*Attorney, Agent, or Firm*—Louis Myers Lahive & Cockfield, LLP

[57] ABSTRACT

Heat transfer between a body and its surrounding fluidous environment is reduced by placing at least one baffle-insulator adjacent to the body, such that the baffle-insulator which has a thermal conductivity of less than about 5 watts/meter-°K, disturbs, modifies, and/or weakens fluidous environment flow about the body, thus reducing heat transfer between the body and its environment.

13 Claims, 6 Drawing Sheets

OTHER PUBLICATIONS

Sparrow, E.M. and Kang, S.S., *Int. J. Heat Mass Transfer*, 1985; vol. 28, No. 11, pp. 2049–2060; "Two Dimensional Heat Transfer and Critical Radius Results for Natural Convection . . .".

Jaber, J.O., Babus'Haq R.F., and Probert, S.D., *Applied Energy*, 1991a, vol. 40, pp. 101–109; Optimal Location of District–Heating Pipeline with a Rectangular Duct.

Neale, A.J., Babus'Haq R.F., and Probert, S.D., *Chem. Eng. Res. Des.*, 1988, vol. 66, pp. 458–462, "Steady–state Heat Transfers Across an Obstructed Air–Filled Rectangular Cavity".

Jaber, J.O., Babus'Haq R.F., and Probert, S.D., *Applied Energy*, 1991, vol. 40, pp. 111–118, "Optimal Thermal–Insulation Placement of district–heating pipes . . .".

Stone, H. *SIAM J. Numer. Anal.*, 1968, vol. 5, No. 3, pp. 530–558; "Iterative Solution of Implicit Approximations of Multidimensional Partial Differential Equations".

Patankar, S.V., *Numerical Heat Transfer and Fluid Flow*, 1980, p. 88, McGraw Hill, NY.

Thermal Insulation Manufacturers Association (TIMA), 1990, Alexadria, VA, "National Industrial Insulation Survey and Analysis of Energy, Environmental, and Economic Impacts".

REDUCTION OF HEAT TRANSFER BETWEEN A BODY AND ITS ENVIRONMENT

BACKGROUND OF THE INVENTION

Heat transfer between a body and its surrounding environment is an inherent response to a non-uniform temperature distribution between the body and the environment. Limiting heat transfer between a body and its environment is highly desirable in many situations. Such heat transfer is the result of conduction, convection, and radiation. Heat transfer by convection occurs when natural forces such as gravity and buoyancy (either positive or negative) due to a temperature gradient between a body and its fluidous environment, and possibly external forces such as a fan, cause the fluidous environment to flow about the body and transfer heat to or from that body. Heretofore, conductive heat transfer was the primary means of control and it was sought by placing one or more layers of an insulating material around the body. Insulation, however, is often expensive, not intended nor effective at dealing with controlling convective heat transfer, difficult to install, and can deteriorate over time. Moreover, some insulation materials, e.g. asbestos, have proven harmful to the environment and man.

Jaber et al., *Optimal Location of a District-Heating Pipeline Within a Rectangular Duct*, Applied Energy, 40, pp. 101–109 (1991), considered the problem of heat transfer in natural convection flow over an insulated horizontal hot-water pipe embedded within an air filled, relatively cold, rectangular air-filled duct. The data suggest an optimal configuration in terms of pipe location relative to the cavity walls which could result in a minimum rate of heat loss from the pipe. Similarly, Jaber et al, *Optimal Thermal-Insulation Placement of District-Heating Pipes and Their Support Baffles in Air Filled Trenches*, Applied Energy, 40, pp. 111–118 (1991), investigated the steady state heat-transfer across a cold, horizontal, rectangular cavity enclosing two relatively hot horizontal pipes. The data suggest that the minimum steady-state heat loss occurs when the two pipes were placed one above the other. The analysis suggests that effective thermal resistance can further be enhanced by physically supporting each pipe with a pair of low-conductivity physical support structures which are termed baffles. The support structures form isolated air spaces in a closed environment. Jaber et al only deal with heated pipes located within cold ducts.

Neale et al, *Steady State Heat Transfers Across an Obstructed Air-Filled Rectangular Cavity*, Chem. Eng. Res. Des., 66, pp. 458–462 (1988) considered the problem of heat transfer from a hot horizontal pipe embedded inside a cold, horizontal, rectangular, airfilled duct. The pipe was assumed to be supported by two, low-conductivity, symmetrically-placed spacers that completely bridge the gap between the pipe and the walls of the duct and extend the length of the pipe. The article suggests that the presence of such spacers could improve the thermal resistance of the air-filled cavity over an unobstructed one. The article is limited to pipes located in a closed environment, i.e. an air-filled duct.

Lai, *Improving Effectiveness of Pipe Insulation By Using Radial Baffles to Suppress Natural Convection*, Int. J. Mass Heat Transfer, 36, pp. 899–906 (1993) discloses the use of baffles solely as an integral part of porous media insulation, i.e. located within the insulation. There is no suggestion of extending the baffles beyond the insulation to further reduce heat loss from the pipe.

Accordingly, there remains a need for improved control or reduction of heat transfer between a body and its fluidous environment without the need of bulky, expensive layers of insulating materials. There is a need to minimize heat transfer between a body, e.g. a pipe, and its environment without going to the extreme of placing the body in an air-filled cavity or isolated duct or for relocating the body.

SUMMARY OF THE INVENTION

The present invention is directed to products and methods for reducing heat transfer between a body and its surrounding fluidous environment which are at different temperatures. This is done by placing at least one baffle-insulator adjacent a body in its fluidous environment. The baffle-insulator has a thermal conductivity of less than about 5 watts/meter-°K, extends into the fluidous environment modifies/weakens the flow of that fluidous environment around the body sufficiently to cause a reduction in convective heat transfer between the body and the fluidous environment.

DETAILED DESCRIPTION OF THE INVENTION

Heat transfer between a body and its fluidous environment occurs by conduction, convection, and radiation. Since radiative heat transfer is relatively low, the total resistance to heat transfer from a body insulated with conventional insulation can be considered to be the sum of the thermal resistance due to the conventional insulation (conductive resistance) and the thermal resistance due to the convection of fluid flow. The total thermal resistance can be increased by either increasing the conductive resistance provided by conventional insulation or by increasing the convective resistance. The conductive thermal resistance can be increased by (i) increasing the thickness of the insulation or (ii) utilizing a more effective insulation.

The present invention deals with increasing the resistance to heat transfer between a body and its fluidous environment by increasing the thermal resistance due to convective heat transfer. This is accomplished by associating, generally attaching, a body at one temperature with one or more low thermal conductivity baffle-insulators which extend into the fluidous environment which is at a different temperature (either higher or lower). The baffle-insulators modify the hydrodynamic and thermal characteristics of the flow of the fluid near the body such that the strength of that flow is reduced and heat transfer between the body and its fluidous environment is reduced.

As used herein unless otherwise stated, "fluidous environment" refers to a fluid or fluids, either liquid or gaseous, e.g. as air, oil, water, process fluid, or the like which flows about a body being insulated. Convective heat transfer between the environment and the body occurs when the two are at different temperatures. As used herein unless otherwise stated, "wall" refers to a surface, either inner or outer, of a body which is at a different temperature than its fluidous environment and to which a baffle-insulator is adjacent.

A baffle-insulator of the present invention is a generally thin extended surface, vane, or the like of a low thermal conductivity material which extends out from a wall of a body into a fluidous environment which flows about the body, either inside, outside, or both. A baffle-insulator disturbs, diverts, alters, or weakens the flow of the fluidous environment in the area of the body wall, thus reducing convective heat transfer to or from the body. Although sometimes physically shaped like fins which are made of high thermal conductivity materials and are used to enhance heat transfer between a body and its environment, a baffle-insulator is made from different materials and functions in a fundamentally different manner. Baffle-insulators are prepared from a material having a low thermal conductivity. One end of a baffle-insulator is adjacent to a wall of the body being insulated and the other end extends freely into the fluidous environment, preferably, the first end will directly or indirectly contact the body. While less desirable, a baffle-insulator may be placed a short distance away from the body wall provided that it is sufficiently close to divert the fluidous environment flow in the immediate vicinity of the body including between the wall and the baffle-insulator. The portion of a baffle-insulator furthermost from the body must be open to flow of the fluidous environment around it, i.e. it must not contact any structure. A baffle-insulator functions by minimizing fluidous environment flow close to the surface of the body being insulated and thereby reducing heat transfer by convection. A baffle-insulator generates regions of relatively stagnant flow, i.e. fluidous barriers, along the body, between the body and its fluidous environment.

While the baffle-insulators of this invention will most commonly be placed outside a heated fluid conduit, e.g. a pipe transporting a heated liquid or gas, they may also be adjacent any body which is at a different temperature than that of its fluidous environment and wherein heat transfer by convection is occurring. The body may extend horizontally, vertically, or any angle therebetween. The body may be spherical. The body may be warmer or colder than its fluidous environment. The fluidous environment may be air, water, or any other fluid or fluids such as oil or a distillate thereof, a process liquid such as a chemical reactant, a food substance, milk, brine, acid, pulp slurry, and the like. When the body is buried, the fluidous environment is water in the ground.

The baffle-insulators are made from materials having thermal conductivities sufficiently low to prevent a baffle-insulator from functioning as heat transfer-enhancing fins. The thermal conductivity of suitable baffle-insulator materials is less than about 5 Watts/meter-°K (W/m-°K), preferably less than about 1.5 W/m-°K, and most commonly in the range of about 0.05 W/m-°K to about 1 W/m-°K. The baffle-insulator should also be sufficiently durable to withstand the conditions of the anticipated fluidous environment for an extended period, preferably the projected life of the body. It should also be non-toxic. It should also be sufficiently temperature resistant to withstand the expected operating conditions. Examples of suitable materials include: polymers such as polyethylene, polypropylene, polystyrene (both foamed and unfoamed), polyimide, polytetrafluoroethylene, polytrifluorochloroethylene, polyurethane, acrylate and methacrylate polymers and copolymers, polyadipamide, polyester, polyvinyl chloride polymers and copolymers; non-polymeric materials such as wood, glass, paper, rubber, leather, wallboard, gypsum, ceramic, cement, conventional insulation materials such as fiberglass, cellulosics, silicates and the like; fabric; and combinations such as plastic-coated fabric and the like. Preferably, the barrier is a polymeric material, either a flat or pleated sheet or fabric thereof which can form multiple baffle-insulators or a sheet or a pre-formed fixed shape which is sufficiently rigid to be self-supporting. Alternatively, conventional building or insulation materials may be produced with external ridges which extend into the fluidous environment sufficiently to break-up the convective flow along the material, perpendicular to the ridges, to reduce heat transfer and serve as "built-in" baffle-insulators. The baffle-insulators reduce heat transfer by at least 1%, preferably at least about 2%, more preferably by at least about 5%.

Typically, a baffle-insulator has generally smooth outer surfaces. If desired, however, the surfaces may be roughened so as to provide additional resistance against fluidous environment flow to divert and weaken that fluidous environment flow around the baffle-insulators.

The baffle-insulators of this invention modify the fluidous environment flow traveling about a body by extending across the predominant direction of the fluidous environment flow, preferably substantially perpendicular thereto, such that the fluidous environment flow is diverted around the baffle-insulator away from the body. In the absence of the baffle-insulators, the path of a fluidous environment flow about a body will be influenced by factors such as the shape of the body, the physical and thermal properties of the fluid of the fluidous environment, constant natural driving forces (e.g. buoyancy and gravity) , variable natural driving forces (e.g. wind) and external driving forces (i.e. man-generated). In operation, a baffle-insulator preferably causes a fluidous barrier to fluidous environment flow to form along the wall of the body and the fluidous barrier reduces the rate of convective heat transfer between the wall and its fluidous environment. Generally, the effectiveness of a specific baffle-insulator system will depend upon (i) the number of baffle-insulators used, (ii) the distance the baffle-insulators extend into the fluidous environment and away from the body being insulated, (iii) the temperature differential between the body and the fluidous environment, (iv) the materials used to form the baffle-insulators, (v) the specific position, orientation, and shape of the baffle-insulator, and (vi) the spacing, if any, between the body and the baffle-insulators.

As indicated, the insulating effect of a baffle-insulator system is dependent upon many variables. Therefore, each specific installation should be separately evaluated to determine an optimum number, shape, and placement of baffle-insulators while considering the economics of manufacture and installation. The evaluations can be performed by simple trial and error in a laboratory setting or by mathematical analysis while considering the well-known governing equations relating to conservation of mass, conservation of momentum, and conservation of energy. i.e. the continuity equation and the Navier-Stokes and energy equations. In the case of natural convection, the Boussinesq approximation may be used to approximate the bouyancy effect. The governing set of partial non-linear differential equations can be solved numerically using an iterative scheme such as the well-known Gauss-Seidel method.

The baffle-insulator length or distance it extends away from a body being insulated is a well-defined, controllable variable in a system. The greater the distance a baffle-insulator extends, the greater the heat transfer reduction, all other variables being constant. The distance can be as small as a few millimeters or as large as a meter or more, depending upon the selection of the other variables, including the extent of insulation desired. For a small cylindrical body, e.g. a pipe, with a radius up to about 6" (15.2 cm), the distance will generally be at least about 0.1 R, preferably at least about 0.2 R, more preferably at least about 0.4 R, where R is the radius of the pipe. For a large cylindrical body, i.e. with a radius of 10 ft (3 m) or more, the distance is generally at least about 1–2" (2.5 to 5.1 cm), though it may be smaller or larger, even 1–2 ft (0.3–0.6 m) or more. For relatively flat bodies. e.g. vertical or horizontal wall surfaces or spherical bodies, the distance will often be at least about 1–2" (2.5 to 5.1 cm). However, very small distances, such as those generated by forming substantially parallel ripples in the outer surface of conventional insulation or building materials may be adequate in some situations.

The thickness of a baffle-insulator is generally not of concern provided that it is sufficient to permit the desired shape and placement of the baffle-insulator to be maintained. Thus, a baffle-insulator may be as thin as about 0.001" (0.025 mm) in certain applications such as buried horizontal pipes. For applications in air, a suitable thickness for a self-supporting structure will generally be at least about 0.005" (0.13 mm). A baffle-insulator may be solid or hollow so long as its weight is such that it retains its placement in use.

One end of the baffle-insulator will be associated with the body being insulated and the other end will extend into the fluidous environment in such a manner that there are no restrictions to flow of the fluidous environment about the end furthermost from the body. Most commonly, the end of the baffle-insulator closest to the body will be in direct contact with a wall of the body. Alternatively, although generally only if required for a particular installation, a baffle-insulator may be placed a short distance away. e.g. up to about 0.1" (0.3 cm) from the body. This will reduce the effect of a baffle-insulator system, but it can be compensated for, at least in part, by increasing the distance a baffle-insulator extends into the fluid and/or increasing the number of baffle-insulators.

To determine the number of baffle-insulators to be used, (i) the temperature difference between the body and its fluidous environment, (ii) the distance the baffle-insulator extends into the fluidous environment, (iii) the length of the body being insulated, (iv) the body size, (v) the fluid type, and (vi) the properties of the porous soil. e.g. permeability, effective thermal conductivity in the case of a buried body, are the most significant physical factors typically considered for each application. The number will also depend on the extent of reduction of heat transfer which is desired or economically warranted since the more individual baffle-insulators present used for a particular system, the greater the benefit. The baffle-insulators are commonly spaced relatively uniformly around or on the body. The specific optimal distribution will depend, at least partially, upon the shape of the body and the above factors. Increasing the number of baffle-insulators will generally provide enhanced performance. As the total number of baffle-insulators increases, provided that each baffle-insulator extends into the fluidous environment flow, the greater the diversion of the fluidous environment flow and the greater the reduction in heat transfer between the body and its environment.

In each situation, if it is assumed that all other parameters are held constant, the greater the temperature difference, the greater the number of baffle-insulators to obtain a particular reduction in heat transfer; the shorter the distance each baffle-insulator extends into the fluidous environment, the greater the number of baffle-insulators; the longer a vertical body, the greater the number of baffle-insulators; the larger the pipe diameter, the greater the number of baffle-insulators; the less the kinematic viscosity of the fluid, the greater the number of baffle-insulators; and the more porous the soil, the greater the number of baffle-insulators.

For vertically disposed bodies, the baffle-insulators should normally extend substantially horizontally and the number of baffle-insulators will generally be such that the distance between successive baffle-insulators is generally less than about 12" (30.5 cm), preferably less than about 6" (15.2 cm), more preferably less than about 3" (7.6 cm). Except under a most extreme temperature difference, e.g. more than about 300° C., or when very short-baffle-insulators are used, vertical baffle-insulators are rarely placed closer together than about 0.25" (0.6 cm).

Specific non-limiting application areas which will benefit by the heat transfer reduction resulting from this invention include such as (i) local heating district systems, (ii) plumbing systems, (iii) refrigeration systems, (iv) buried steam pipes, (v) pipelines used for transporting crude oil, (vi) buried hot or chilled water lines, (vii) energy storage systems, (viii) boiler surfaces, (ix) transportation systems of hot industrial liquids and gases, (x) storage tanks containing fluids, (xi) vertical surfaces or walls of homes or other buildings, (xii) all steam pipes and hot water pipes, whether previously insulated or not, and the like.

The invention will now be described further with particular reference to the various embodiments shown in the figures.

Figure 1:
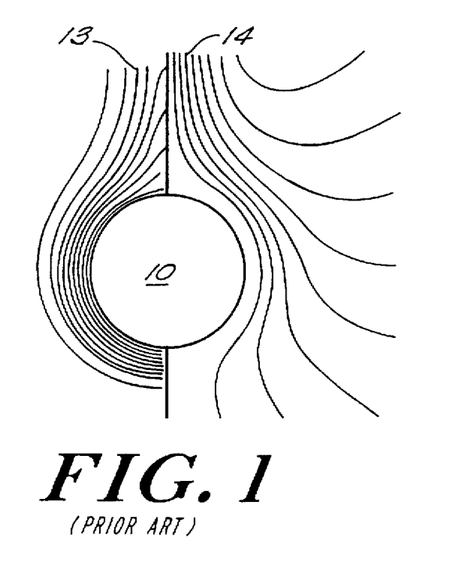
FIG. 1 is a plot of uniformly spaced isotherms (left side) and streamlines (right side) of the convective fluid flow outside a prior art horizontal pipe with no baffle-insulators.

FIG. 1 shows the flow of a fluidous environment around a hot horizontal pipe 10 which has no baffle-insulator associated with it and the flow 14 traveling around the surface of the pipe 10 converging as it rises. In the absence of a fluidous barrier, the fluidous environment flow 14 about the pipe is unrestricted and heat will transfer to a fluidous environment by convection at a rate proportional to the temperature difference. The isotherm 13 about the pipe 10 is also shown.

Figure 2:
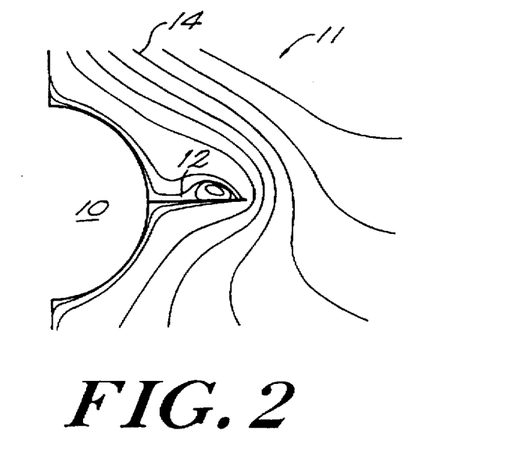
FIG. 2 is a detailed streamline plot of the fluid flow around a single baffle-insulator attached to a horizontal pipe in accordance with this invention.

In FIG. 2 an uninsulated hot horizontal pipe 10 in a fluidous environment 11 is shown with a single baffle-insulator 12 placed outside the pipe. A streamline plot of the fluidous environment flow 14 around the baffle-insulator 12 is also shown. The streamline plot assumes the pipe to be surrounded by a fluidous environment with only gravity and the buoyancy force affecting the direction of fluidous environment flow about the pipe. For the hot horizontal pipe 10 of FIG. 2, the predominant direction of fluidous environment flow 14 is vertical and therefore when a single baffle-insulator is used, as shown, it will generally extend along the entire length of the pipe 10 to maximize the reduction of heat transfer. Similarly, when two baffle-insulators 12 are used, each will commonly extend horizontally to either side of the body. As the number of baffle-insulators increases beyond two, the additional ones are placed around the body, most commonly but not necessarily, uniformly. It may not always be possible to extend the baffle-insulators the full length of a pipe due to the physical location of a pipe or some other reason and thus multiple short sections of baffle-insulator may be used with some unmodified areas between the sections.

Figure 3:
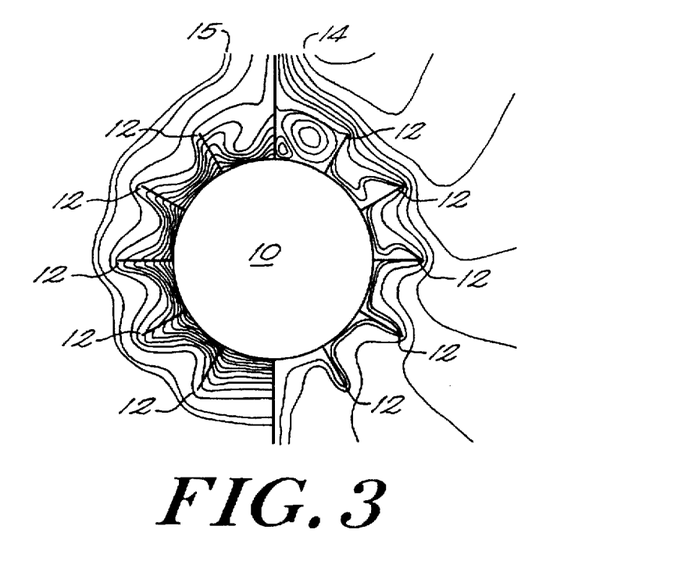
FIG. 3 is a cross-sectional schematic view of a horizontal pipe having ten baffle-insulators extending substantially perpendicularly from the pipe showing isotherms and streamlines.

FIG. 3 shows the flow of a fluidous environment due to gravity and bouyancy around a hot horizontal pipe 10 which has ten baffle-insulators 12 associated with it and with the flow 14 traveling around the surface of the pipe 10 and converging as it rises. The isotherm 15 about the pipe 10 is also shown.

Figure 4:
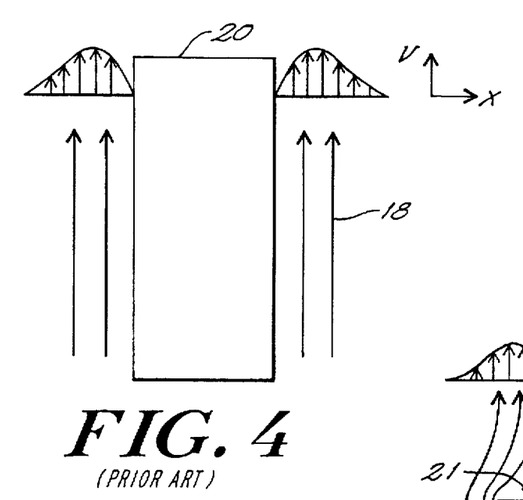
FIG. 4 is a partial schematic view of a prior art vertical pipe with no baffle-insulator attached and showing streamlines of convective fluid flow about the pipe and the velocity profile of the air flow adjacent to the pipe.
Figure 5:
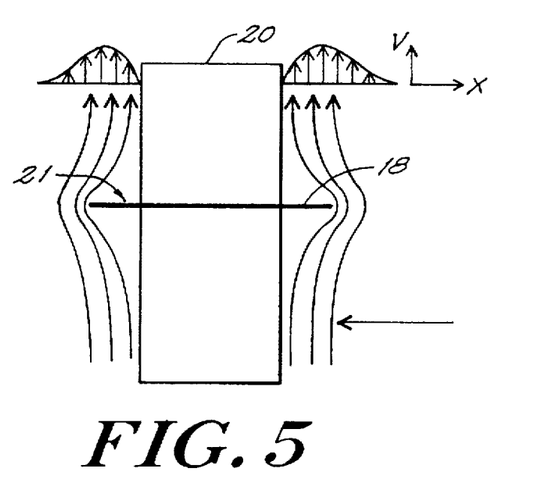
FIG. 5 is a partial schematic view of a vertical pipe with a single radial baffle-insulator attached in accordance with this invention, showing streamlines of the convective fluid flow and the velocity profile of the air adjacent to the pipe.
Figure 6:
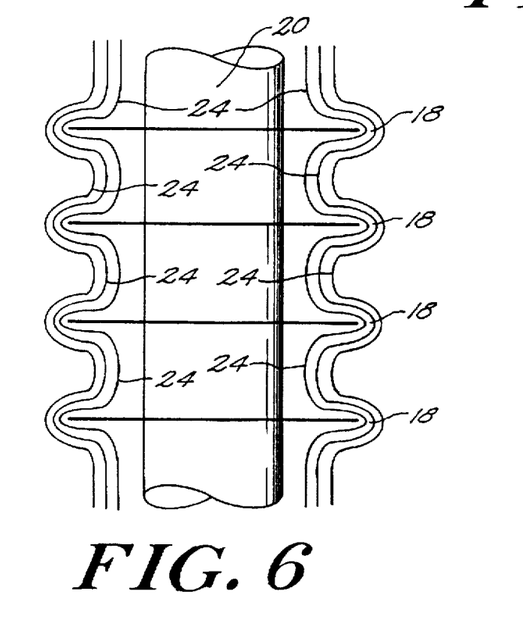
FIG. 6 is a partial schematic view of a vertical pipe with four radial baffle-insulators attached in accordance with this invention and showing streamlines of the convective fluid flow.

FIGS. 4, 5, and 6 show a second embodiment of the invention in which fluidous environment flow is substantially vertical along the length of a vertical pipe. FIG. 4 shows the fluidous environment flow 18 outside a prior art hot vertical pipe 20 having no baffle-insulators attached. The fluidous environment flow 18 travels upward parallel to the hot surface of vertical pipe 20. In the absence of any fluidous barriers associated with the pipe, there is no resistance to fluidous environment flow and heat will transfer to or from the fluidous environment at a rate dependent predominantly upon the temperature differential. FIG. 4 also includes a velocity profile 19 of the rate of flow versus distance from the outer surface of the vertical pipe 20.

FIG. 5 shows a single radial baffle-insulator 21 placed around a hot vertical pipe 20 in which the fluidous environment flow 18 is parallel to, i.e. along the length of the vertical pipe 20. When a vertical pipe 20 is surrounded by a fluidous environment such as air and no forces other than gravity and the buoyancy force affect the direction of the fluidous environment flow, horizontally extending radial baffle-insulators 21 are used to enhance resistance to heat transfer. The radial baffle-insulators 21 along the length of a vertical pipe 20, as shown in FIG. 6, create fluidous barriers 24 that reduce the rate of convective heat transfer to or from the vertical pipe 20.

Figure 7:
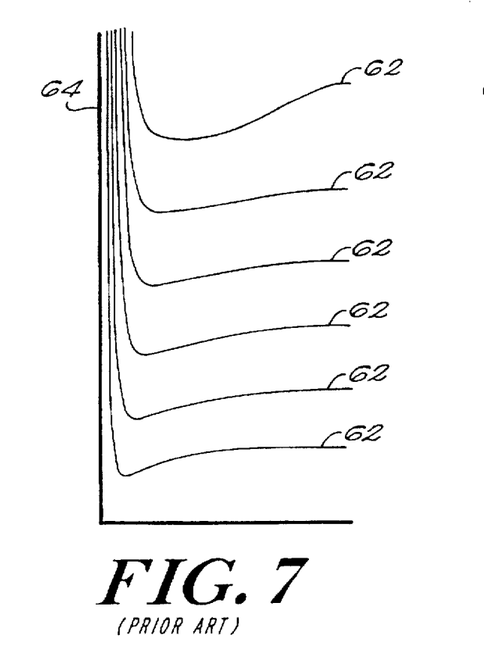
FIG. 7 is a side view of fluidous environment flow traveling along a prior art L-shaped surface with a heated vertical wall.
Figure 8:
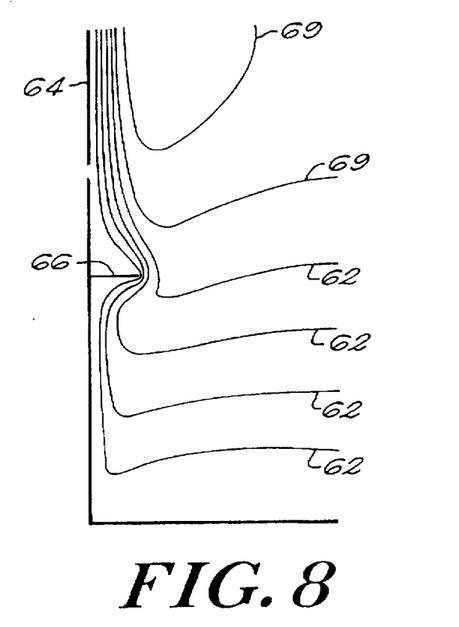
FIG. 8 is a side view of fluidous environment flow traveling along an embodiment of the invention wherein a horizontal planar baffle-insulator is attached to the vertical wall of FIG. 7.
Figure 9:
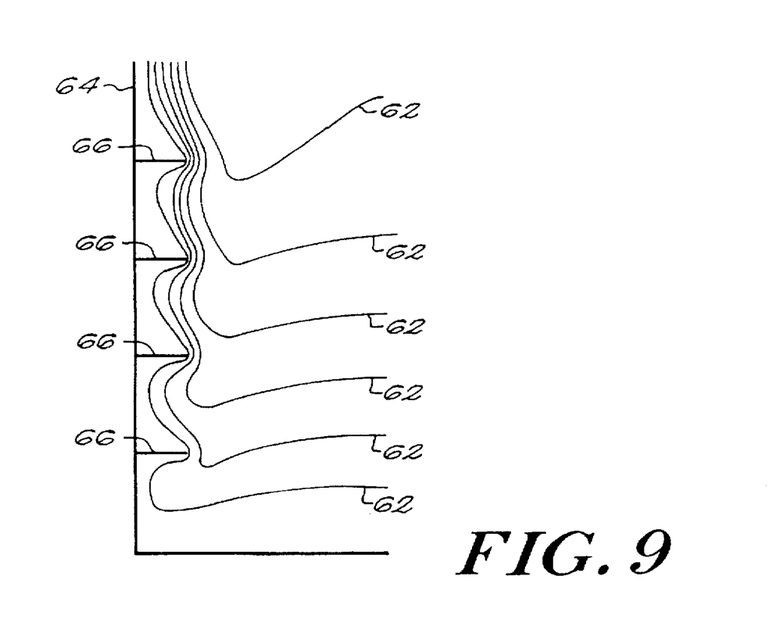
FIG. 9 is a side view of fluidous environment flow traveling along the heated vertical wall of FIG. 7 having four horizontal planar baffle-insulators attached thereto.
Figures 10, 11:
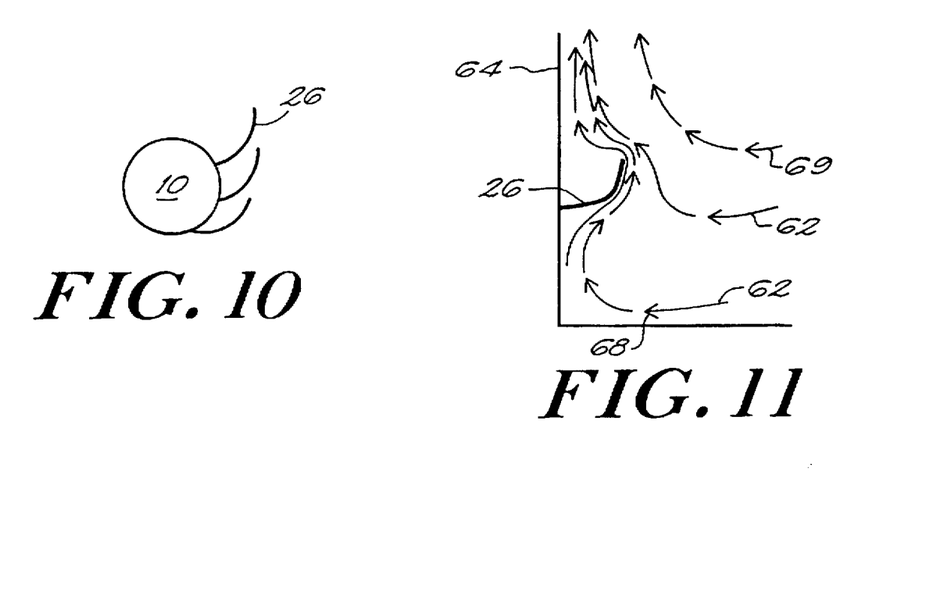
FIG. 10 is a cross-sectional view of an embodiment of the invention having three curvilinear baffle-insulators attached to a horizontal pipe.
FIG. 11 is a side view of the fluidous environment flow about a heated vertical wall having a curvilinear baffle-insulator attached thereto.

FIG. 7 shows the flow of a fluidous environment at the base of a heated vertical wall 64 which has no baffle-insulator associated with it. The flow 62 travels along the vertical surface of the wall 64 as it rises due to bouyancy. In the absence of any fluidous barriers, the fluidous environment flow 62 along the wall 64 is unrestricted and heat will transfer to the fluidous environment by convection at a rate proportional to the temperature difference. FIGS. 8 and 9 show the flow of the fluidous environment when one (FIG. 8) and four (FIG. 9) horizontal baffle-insulators 66 are placed on the heated vertical wall 64. As shown, the hot ascending fluidous environment flow 62 is diverted away from the wall by the baffle-insulators and mixes with cooler fluidous environment flow 69 drawn from the side, thereby reducing heat transfer. As best seen in FIG. 9, relatively stagnant fluidous areas form between between successive wall baffle-insulators.

Although FIGS. 2, 3, 5, and 6 show the baffle-insulators 12 and 18 outside uninsulated pipes 10 and 20, the baffle-insulators may also be used in conjunction with conventional insulation. When insulation is present, the baffle-insulators will generally be placed atop the insulation, extending from the outside of the insulation into the fluidous environment flow. Alternatively, the baffle-insulators may be placed around a body and then partially covered by insulation. When insulation is present, the distance a baffle-insulator is deemed to extend into the fluidous environment is the distance from the outside of the insulation to the farthermost point. When baffle-insulators are associated with an insulated body, the baffle-insulators will preferably be attached to the outside of the insulation. Alternatively, a baffle-insulator may be formed as an extension of the insulation surface.

When an uninsulated hot body is protected only by baffle-insulators of this invention, it is preferable that a low emissivity jacket be used to cover the body either before attaching the baffle-insulators or as part of the baffle-insulator attaching mechanism to minimize radiative heat transfer from the body.

While FIG. 2 shows a planar baffle-insulator 12 and FIG. 5 a radial baffle-insulator 21, the baffle-insulators may be of any shape which will retard fluidous environment flow around a body. The specific shape will generally be a simple plane but, depending on the fluid resistance desired and the likelihood of variation in the direction of expected fluidous environment flow, more complex shapes may be used. FIG.

Figure 12:
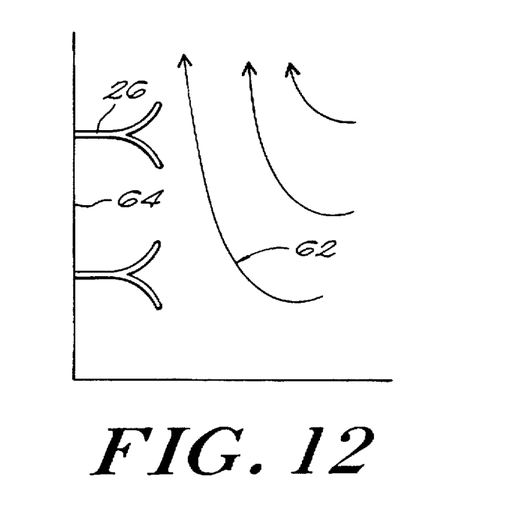
FIG. 12 is a side view of the fluidous environment flow along a heated vertical wall having two complex curvilinear baffle-insulators attached thereto.
Figure 20:
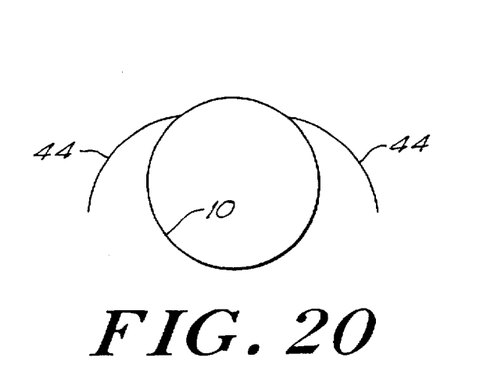
FIG. 20 is a partial side view of two curved baffle-insulators intended for use with horizontal bodies.

10 shows three curvilinear baffle-insulators 26 associated with a horizontal pipe 10. Such curvilinear baffle-insulators may be particularly useful when a significant portion of the fluidous environment flow originates from beside, as compared to below, the baffle-insulator. This is best seen by comparing FIGS. 8 and 11 in which the flow is shown around a planar baffle-insulator 66 and a curvilinear baffle-insulator 26, each attached to a heated vertical wall 64. When a horizontal baffle-insulator 66 is placed on the vertical wall 64 as shown in FIG. 8, a hot ascending fluidous environment flow 62 is diverted away from the wall by the baffle-insulator and mixes with cooler fluidous environment flow 69 drawn from the side. When an upwards-facing curvilinear baffle-insulator 26 is attached to a heated wall as in FIG. 11, the curvature of the baffle-insulator 26 will help limit the amount of cooler fluidous environment flow stream 68 which reaches the hotter wall 64 just immediately above the baffle-insulator 26, thus increasing the thermal resistance and reducing the heat transfer rate. Other curvilinear baffle-insulators may face downward as shown in FIG. 20 or be a complex structure having portions facing in two directions, e.g. both up and down, as shown in FIG. 12 in which two complex curvilinear baffle-insulators 26 are attached to a heated vertical wall 64 and the air flow is indicated by lines 62. Such a baffle-insulator structure may be molded from a suitable low thermal conductivity polymer.

Figure 13:
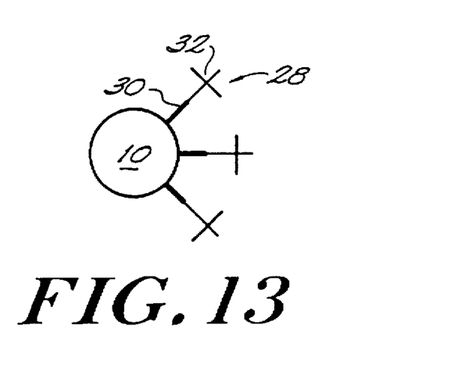
FIG. 13 is a cross-sectional view of a horizontal pipe with three complex baffles, each having an articulated secondary surface or vane, attached thereto.

In FIG. 13, three complex-shape baffle-insulators 28 are attached to a horizontal pipe 10. In this embodiment, a planar baffle 30 has been modified by attaching thereto a perpendicular baffle-modifier unit 32. Such complex baffle-insulators are particularly suitable for use with bodies having complex geometries or in fluidous environments wherein the flow will not solely be due to gravity and bouyancy. Complex shape baffle-insulators are likely to lead to enhanced overall performance, although the increased manufacturing cost may not always be economically justified.

Figure 14:
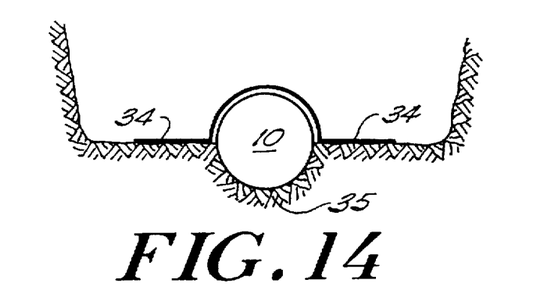
FIG. 14 is a cross-sectional view of another embodiment of the invention wherein a baffle-insulator is a sheet-like material placed atop a horizontal pipe in a trench after the pipe has been partially buried in the ground and then the trench back-filled.
Figure 15:
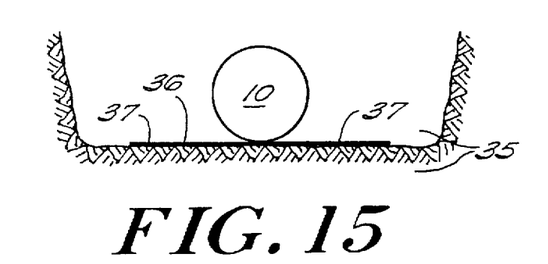
FIG. 15 is a cross-sectional view of an embodiment wherein a baffle-insulator is formed from a sheet-like material placed below a horizontal pipe in a trench which is then back-filled.

FIGS. 14 and 15 show double baffle-insulators 34 and 36 particularly useful with buried pipes. In FIG. 14 a baffle-insulator sheet 34 or a pre-formed material is placed atop a pipe 10 partially buried in the ground 35. Particularly suitable baffle-insulators 34 for buried installations include single 0.002" sheets of plastic, such as polyethylene or polypropylene, laid over the pipe 10 in a trench prior to backfilling that trench with dirt. FIG. 15 shows an alternative structure for use in buried installations in which a flat sheet of baffle-insulator material 36 is placed on the earth surface below a horizontal pipe 10. The baffle-insulator material sheet 36 extends horizontally to both sides of the pipe, thereby forming two baffle-insulators 37. For buried horizontal placements, the preferred baffle-insulators are formed by placing a sheet of a baffle-insulator material either immediately below the horizontal body (FIG. 15), or atop the horizontal body after it has been partially, preferably about ½, buried (FIG. 14), or atop the horizontal body after the top has been almost completely buried but prior to completely filling the area around the body with dirt (not shown), or any combination of these.

Figure 16:
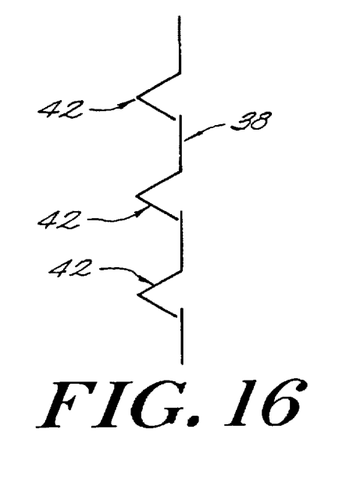
FIG. 16 is a partial side view of a pleated structure wherein each pleat forms a baffle-insulator.
Figure 17:
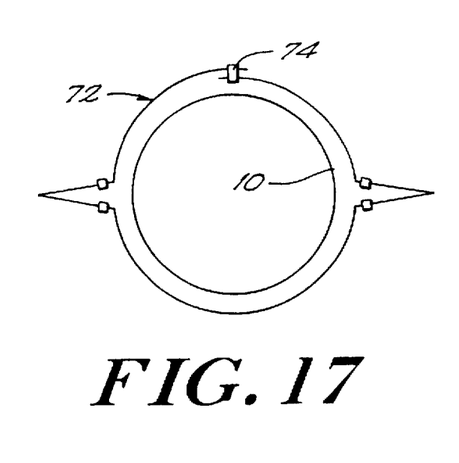
FIG. 17 is a cross-sectional schematic view of a horizontal pipe with planar baffle-insulators attached to a pipe with snap-on connectors.
Figure 18:
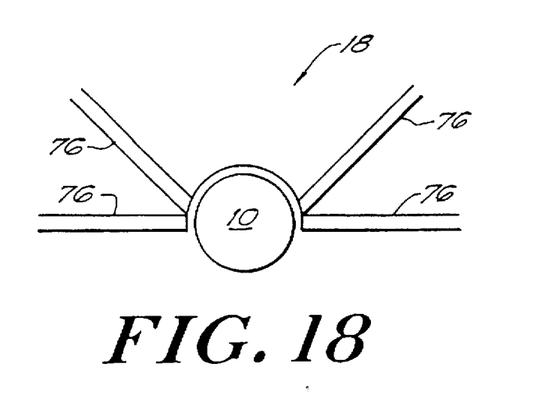
FIG. 18 is a side view of a stiffened wire frame structure with four baffle-insulator holding places for use with and in place atop a horizontal pipe.

Suitable procedures for forming a particular baffle-insulator structure and associating that structure with a body will generally depend upon the number of baffle-insulators which are to be used with a particular body and the physical location of that body, i.e. horizontal or vertical, above ground or below. For non-buried horizontal bodies and vertical walls, a particularly convenient method of preparing a baffle-insulator structure when there will be a plurality of individual baffle-insulators is to use a sheet of baffle-insulator material and fold it to form suitably sized pleats as shown in FIG. 12, wherein the pleats are in fact the baffle-insulators. Specifically, in FIG. 16 a multiple baffle-insulator structure 38 is prepared from a continuous, preferably plastic, sheet with pleats 42 formed therein. The individual pleats/baffle-insulators may be formed to have any desired size and/or distance between successive ones. As shown in FIG. 16, the two surfaces which form each pleat are not connected. However, depending upon the baffle-insulator structure desired and/or the physical characteristics of the specific material, it will likely be advantageous to join them together to form planar baffle-insulators. When a sheet is used which is rigid enough so that each pleat will be self-supporting, the sheet can be folded to form pleats/baffle-insulators and the pleats then held in place, if needed, temporarily or permanently, by means such as glue, stitching, heat and the like. Alternatively, external physical male-female connectors, e.g. snaps or Velcro® material, can be inserted at suitable points along a pleat. If the material is such that the pleats are not adequately self-supporting, stiffener means may be inserted into each pleat. In either case, such a baffle-insulator structure can be attached to a non-buried horizontal body 10 as shown in FIG. 17 by wrapping it once around the body 10 and connecting the two ends 74 with means such as glue, male-female connectors, or the like. It can be attached to a vertical wall by suspending it from the top of the wall.

an alternative method for generating multiple baffle-insulators in a single structure is shown in FIG. 18 in which a frame 78 is preshaped to have the desired number, in this case four, of baffle-insulator holding means 76. Individual pieces of baffle-insulator material may be inserted into one or more of the holding positions. Alternatively, a sheet of baffle-insulator material may be attached to the outside of the structure, i.e. around, rather than in, each holding position 76. A third possibility is to insert individual rigid pleats from a pleated sheet of baffle-insulator material into one or more of the holding means. The frame may be formed as a single unified structure or as two separate pieces which will serve as end-caps. Such frames can be formed from such as thin metal wire, molded from low thermal conductivity plastics, and the like. In all such cases, the structures can be attached to the horizontal bodies by any suitable means, e.g. a strap.

Figure 19:
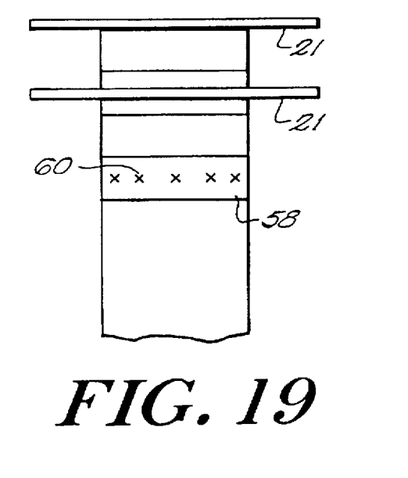
FIG. 19 is a partial side view of a vertical pipe showing a radial baffle-insulator in place and a strap for supporting a second radial baffle-insulator about the pipe.

For small vertical cylindrical bodies the baffle-insulators will be generally flat bodies with a central cut-out in the shape of the body, e.g. a pipe, as needed. Such structures may be attached to a pipe by wrapping a belt-like structure having a small radial lip around the pipe as shown in FIG. 19 in which a radial baffle-insulator 21 is associated with a body by means of a beltlike strap 58 having baffle-insulator supports 60 projecting outward therefrom. After a strap 58 is placed around the outer surface of the body, a baffle-insulator disc 18 can be supported by the projections 60 on strap 58. Alternatively, multiple radial baffle-insulators may be connected by string or the like in the manner of venetian blinds and then suspended from a point above the vertical body.

For planar vertical, large cylindrical, and spherical bodies, e.g. flat walls, large cylindrical and spherical storage tanks, the baffle-insulators may be individually attached to the bodies by any suitable attachment means. Alternatively, a series of baffle-insulators may be connected by string or the like in the manner of venetian blinds and then suspended from above the planar vertical body. Similarly, the baffle-insulators may be prefabricated into a body wall by intentionally forming a series of ripples or the like which are present in sufficient numbers and extend into the fluidous environment sufficiently to disrupt the fluidous environment flow and reduce the rate of heat transfer between the body and the fluidous environment. Generally the ripple-insulators will extend very short distances, e.g. 1–5 mm, although it may be possible to form larger ripple-insulators, e.g. up to about 0.51" or more.

Figure 21:
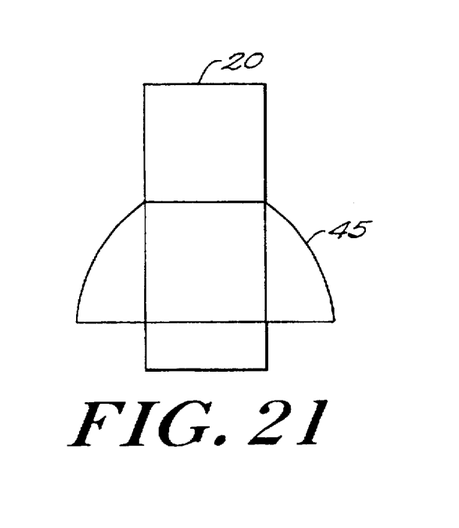
FIG. 21 is a partial side view of a curved radial baffle-insulator intended for use with vertical bodies and placed outside a vertical pipe.

FIGS. 20 and 21 show additional baffle-insulator structures. Specifically, in FIGS. 20 two curved baffle-insulators 44 are attached to the upward side of a horizontal pipe 10. In FIG. 21, a single radial baffle-insulator 45 is shown attached to a vertical pipe 20.

While the direction of expected fluidous environment flow is generally substantially vertical due to gravity and the buoyancy force, the direction can be readily determined for situations in which other forces alter it. Determining the expected predominant direction of the fluidous environment flow outside a body will be helpful in optimumizing a system by determining specific shape, number, and placement of the baffle-insulators. Specifically, the primary direction of the fluidous environment flow may be determined by consideration of the geometry and the forces which effect the fluidous environment flow. In the case of natural convection only, the direction of the fluidous environment flow may be determined from the temperature gradients of a body in its fluidous environment. If a body is warmer than its fluidous environment, the buoyancy force acts upwardly and the fluidous environment flow will move upward. If a body is cooler than its fluidous environment, the buoyancy force acts downwardly and the fluidous environment flow moves downward. When the fluidous environment flow is effected by a combination of natural convection and a force induced by a mechanical device, e.g. a fan, then the effective direction of the fluidous environment flow can be readily calculated based upon the relative strengths and directions of the various forces using conventional vector analysis.

The present invention will now be described with reference to the following Examples. It is understood that these Examples are for illustrative purposes only and should not be deemed as limiting this invention.

EXAMPLE 1

In this example, heat transfer rates are determined for a horizontal pipe having a temperature greater than its fluidous environment for (i) a prior art uninsulated pipe, (ii) a prior art insulated pipe, and (iii) four insulated pipes of this invention having 2, 6, 10, or 22 baffle-insulators attached to the pipe.

A pipe 2.54 cm (1") in diameter is used and the pipe is suspended horizontally in air. The insulated pipe is covered with 1.27 cm (0.5") fiberglass insulation. When the insulated pipe is modified in accordance with this invention at a range of pipe surface temperatures T of 26°, 32° and 95° C., and 2, 6, 10, or 22 baffle-insulators are attached thereto, the baffle-insulators are formed by pleating a sheet of polypropylene by attaching multiple male-female connectors suitable distances apart that each pleat extends a distance of 1.27 cm beyond the outside of the insulation. These baffle-insulators have a simple planar shape and are attached to the pipe by wrapping the pleated sheet around the pipe and joining the ends. Polypropylene has a thermal conductivity of about 0.14 watts/meter/° K. When an insulated pipe is at a temperature of 675° C., the outer surface of the insulation is about 120° C. and polypropylene baffle-insulators are formed as above.

The heat transfer per unit length (watts per meter) from the various pipes is evaluated at four different temperature gradients wherein the temperature of the air outside the pipe is room temperature, 25° C., and the temperature T of the pipe is 26°, 32°, 95°, or 675° C. The heat transfer, in watts/meter, along with those of the two prior art systems of (i) an uninsulated pipe and (ii) an insulated pipe having no baffle-insulators attached, are given in Table I. N is the number of baffle-insulators used.

TABLE I

| | Heat Transfer (watts/meter) | | | | | |
|---|---|---|---|---|---|---|
| | | | N | | | |
| T °C. | Uninsulated | None | 2 | 6 | 10 | 22 |
| 26 | 0.28 | 0.23 | 0.21 | 0.19 | 0.18 | 0.17 |
| 32 | 3.16 | 2.03 | 1.95 | 1.69 | 1.55 | 1.40 |
| 95 | 53.21 | 24.81 | 24.29 | 22.07 | 20.79 | 17.76 |
| 675 | 840.76 | 269.22 | 267.27 | 255.33 | 253.85 | 237.16 |

The placing of multiple baffle-insulators outside the pipe is highly effective in reducing heat transfer from the pipe. For example, when the temperature of the pipe is 95° C., the addition of the fiberglass insulation 1.27 cm (0.5") thick around the entire pipe reduces heat loss by 53%. By adding 2 baffle-insulators to the insulated pipe, the total reduction in heat loss increases to 54%. By using 6 baffle-insulators, the total reduction increases to 59%. By using 10 baffle-insulators, the total reduction becomes 66%. And when the number of baffle-insulators is increased to 22, the total reduction in heat loss is increased to 67%.

Another way to evaluate the effect of the baffle-insulators is to determine the percent reduction in heat loss starting with the insulated pipe. Based thereon, the % reduction in heat loss in view of the number of baffle-insulators with a 95° C. pipe is:

| Number of Baffle-Insulators | % Reduction Heat Transfer |
|---|---|
| 2 | 2.1 |
| 6 | 11.0 |
| 10 | 16.2 |
| 22 | 28.4 |

Similar substantial reductions in heat transfer are evident for temperatures of 26° and 32° C. When the temperature of the pipe increases to 675° C., the effectiveness of the baffle-insulators, although still present, is lower due to the hydrodynamic and thermal characteristics of the system. Generally as the temperature difference between the body and its surrounding fluidous environment increases, the length of the baffle should also increase to retain the same overall effectiveness. Thus if longer baffle-insulators were used at 675° C., similar performance results could be obtained as at lower temperature gradients.

Perhaps a better way to consider the enhanced reduction in heat transfer is to determine the total thickness of fiberglass insulation that would be required to obtain comparable rates of total heat transfer for a body at various temperatures. The data in Table II indicate the total insulation thickness in centimeters which would be required to produce the enhanced heat loss rates of the combination of insulation and the various number N of baffle-insulators.

TABLE II

| | Equivalent Insulation Thickness in Centimeters | | | | |
|---|---|---|---|---|---|
| T °C. | N = 0 | N = 2 | N = 6 | N = 10 | N = 22 |
| 26 | 1.27 | 1.91 | 3.56 | 4.47 | 5.16 |
| 32 | 1.27 | 1.49 | 2.35 | 3.09 | 4.18 |
| 95 | 1.27 | 1.36 | 1.74 | 1.98 | 3.0 |
| 675 | 1.27 | 1.3 | 1.45 | 1.46 | 1.68 | the results indicate that substantial amounts of conventional insulation can be replaced by very inexpensive and safe polypropylene baffle-insulators and yield the same insulation effect, i.e. produce the same heat loss. For example, when the temperature is 95° C., the heat loss achieved by attaching 2 baffle-insulators to a pipe insulated with 1.27 cm of insulation is 24.29 W/m. To achieve this heat loss with only insulation, 7% more insulation would be needed. To achieve the heat transfer results obtained with 1.27 cm of insulation and 10 baffle-insulators, 56% more insulation (a total of 1.98 cm) is required. And 136% more insulation is needed to achieve the heat loss rate obtained with 1.27 cm of insulation and 22 baffle-insulators.

EXAMPLE 2

To determine the effect of varying the distance that the baffle-insulators extend away from a horizontal heated body in room temperature air, the procedure of Example 1 is repeated. The heat transfer rates are determined for (i) insulated pipes of the prior art (without baffle-insulators) with (ii) uninsulated pipes of this invention with baffle-insulators prepared as in Example 1, extending 0.64 or 1.27 cm from the surface of the pipe, uniformly distributed about the pipe. The results are presented in Table III at three heated body temperatures, T=26°, 32°, and 95° C. The numbers in parentheses are the heat losses that occur in watts per meter. The lower the rate of heat loss, the better the insulating effect.

TABLE III

| | Rates of Heat Loss (Watts/Meter) | | | | |
|---|---|---|---|---|---|
| | | Baffle Distance into Air, cm | | | |
| T °C. | Insulated Pipe | 0.64 Uninsulated Pipe | | 1.27 Uninsulated Pipe | |
| 26 | 0.23 | N = 6 | (0.22) | N = 6 | (0.18) |
| 32 | 2.03 | N = 10 | (3.0) | N = 6 | (1.79) |
| 95 | 24.81 | N = 22 | (24.2) | N = 22 | (16.82) |

The results indicate that baffle-insulators can totally eliminate the use of conventional insulation in certain circumstances. For example, when the temperature of the heated body is 95° C. and 22 baffle-insulators are used which extend outwardly 0.64 cm, a heat loss rate 24.2 W/m which is lower than the heat loss rate 24.81 W/m achieved when the pipe has conventional 1.27 cm layer of fiberglass insulation.

EXAMPLE 3

The effect of placing two planar baffle-insulators outside an uninsulated horizontal pipe buried at several distances underground is determined. The pipe has a diameter of 0.2 m and the planar baffle-insulators extend horizontally from the pipe and have a thermal conductivity of 0.2 W/m-°K. The soil is permeable to fluid motion, and the surface of the pipe is maintained at a constant temperature of 150° C. Three baffle-insulator lengths are evaluated, i.e. 5, 10, and 20 cm. The two baffle-insulators are placed longitudinally, opposite to each other, and are laid over the pipe prior to backfilling the trench with dirt. The results for the heat transfer per unit length (W/m) are shown in Table IV wherein the average earth temperature is about 12° C.

TABLE IV

| | Heat Transfer per Unit Length (W/m) | | | |
|---|---|---|---|---|
| Burial Distance | No insulation of any | Baffle-Insulator Length | | |
| (m) | kind | 5 cm | 10 cm | 20 cm |
| 0.3 | 2,745 | 2,507 | 2,245 | 1,897 |
| 0.4 | 2,816 | 2,568 | 2,337 | 2,024 |
| 0.5 | 2,971 | 2,711 | 2,443 | 2,172 |
| 0.6 | 2,975 | 2,719 | 2,465 | 2,179 |
| 0.8 | 3,063 | 2,790 | 2,523 | 2,234 |
| 1.0 | 3,117 | 2,837 | 2,575 | 2,281 |

The results indicate that (i) the baffle-insulators are effective in underground use and (ii) the use of longer baffle-insulators reduces heat transfer to a greater extent than shorter baffle-insulators.

EXAMPLE 4

In this example, heat transfer rates are determined for a vertical wall having a temperature greater than its fluidous air environment for four planar baffle-insulators of various lengths.

An L-shaped heated vertical wall as in FIG. 7 about 0.3 m high is exposed to air which is 5° C. cooler. The heat transfer loss per unit depth-length from the wall is about 3.9 W/m. An insulated structure as in FIG. 9 has four baffle-insulators, each extending about 3 cm (1.18") from the wall. The baffle-insulators are perpendicular to the vertical wall, extend the width of the wall, and are uniformly spaced. Each baffle-insulator is an acrylic polymer sheet having a simple planar shape and a thermal conductivity of about 0.2 W/m-°K. The baffle-insulators are joined and form mini-blinds which are attached atop the wall. The heat loss from the wall having four baffle-insulators extending 3 cm from the wall is 3.5 W/m, a 10% reduction.

The decrease in heat transfer rate as the distance the baffle-insulators extend from the wall increases is shown in Table V.

TABLE V

| Distance (cm) | Heat Transfer Rate (W/m) |
|---|---|
| — | 3.9 |
| 3.0 | 3.5 |
| 4.0 | 3.2 |
| 6.0 | 2.9 |

What is claimed is:

1. A method of insulating an above ground horizontal pipe, having a first temperature, from the surrounding ambient gaseous environment comprising:
   forming baffle-insulators of a material having a thermal conductivity of less than about 5 watts/meter-°K;
   extending said baffle-insulators across the predomninant direction of flow of the surrounding gaseous environnient, forming each of said baffle-insulators so as to have at least one thin extended surface extending primarily radially or tangentially outwardly from the surface of the above ground horizontal pipe a sufficient distance to modify the hydrodynamic and thermal characteristics of the flow of the surrounding gaseous ambient environment near said pipe such that the strength of the flow is reduced and the heat transfer between the pipe and the surrounding ambient gaseous environment is reduced significantly by forming regions of relatively stagnant flow;

forming each of said baffle-insulators such that a portion of said at least one thin extended surface furthest from said pipe does not contact any structure and is open to the flow of the surrounding ambient gaseous environment;

forming said baffle-insulators without any enveloping structure and forming said baffle-insulators such that the area between any two baffle-insulators is substantially open to the surrounding gaseous environment.

2. The method of insulating an above ground horizontal pipe of claim 1 wherein said material of said baffle-insulators is a polymer.

3. The method of insulating an above ground horizontal pipe of claim 2 wherein said polymer is selected from the group polyethylene, polypropylene, polystyrene, foamed polystyrene, unfoamed polystyrene, polyimide, polytetrafluoroethylene, polytriflorochloroethylene, polyurethane, acrylate and methacrylate polymers and copolymers, polyadipamide, polyester, polyvinyl chloride polymers and copolymers.

4. The method of insulating an above ground horizontal pipe of claim 1 wherein said material of said baffle-insulators is a non-polymeric material.

5. The method ol insulating an above ground horizontal pipe of claim 4 wherein said non-polymeric material is selected from the group wood, glass, paper, rubber, leather, wallboard, gypsum, ceramic, cement, conventional insulation materials such as fiberglass, cellulosis, silicates and the like; fabric; and plastic-coated fabric.

6. The method of insulating an above ground horizontal pipe of claim 1 wherein said thin extended surface of said baffle-insulators is a roughened surface.

7. The method of insulating an above ground horizontal pipe of claim 1 wherein said pipe is cylindrical in shape.

8. The method of insulating an above ground horizontal pipe of claim 1 wherein said pipe is insulated.

9. The method of insulating an above ground horizontal pipe of claim 1 wherein said baffle-insulators have a planar shape.

10. The method of insulating an above ground horizontal pipe of claim 1 wherein said baffle-insulators are curvilinear baffle-insulators.

11. The method of insulating an above ground horizontal pipe of claim 1 wherein said baffle-insulators are pleated.

12. The method of insulating an above ground horizontal pipe of claim 1 wherein said baffle-insulators have a thickness of at least 0.13 mm.

13. The method of insulating an above ground horizontal pipe of claim 1 wherein said baffle-insulators are hollow.

* * * * *